July 20, 1965          H. KOCH          3,195,598
DEVICE FOR COMMINUTING VEGETABLES, FRUIT OR THE LIKE, BY GRATING
Filed Aug. 22, 1962          2 Sheets—Sheet 1

INVENTOR
Hans Koch
By Kelman and Berman
Agents 3,195,598
DEVICE FOR COMMINUTING VEGETABLES, FRUIT OR THE LIKE, BY GRATING
Hans Koch, Munich-Pasing, Germany, assignor to Hans Koch and Viktoria Koch, trading as Ritterwerk F. Ritter & Sohn, Munich-Pasing, Germany
Filed Aug. 22, 1962, Ser. No. 218,692
Claims priority, application Germany, Aug. 28, 1961, R 31,004
7 Claims. (Cl. 146—177)

This invention relates to a device for comminuting vegetables, fruit or the like by grating or the like.

Devices of this kind are already known and usually consist essentially of a handle part and a cutter plate. The handle part is frequently formed by the frame carrying or enclosing the cutter plate.

Other known cutting devices for comminuting foods are of the type disclosed in United States Patent No. 2,736,092, and contain a cutting cylinder which consists of disc cutters spaced apart on a hollow shaft, the said cylinder being rotatable on a detachable shaft in a protective casing constructed in the form of a handle. Such cutting devices include a lower cover or stripper plate on the casing which is intended to prevent any food residues adhering to the disc cutters from penetrating to the interior of the protective casing. For fastening purposes, the two side edges of the stripper plates are bent over at right-angles and the said plates carry wedge-shaped lugs which are formed with apertures for the passage of the detachable shaft and which fit into corresponding flat recesses on the inside of the side parts of the casing.

The object of the invention is to replace the said stripper plate in the above-described cutting device by a cutter plate attachment which, like the cutting cylinder or stripper plate in the known cutting devices, can be detachably connected to the casing. This gives a universal kitchen utensil with advantages over previously known devices of this kind, and these advantages will be apparent from the following.

The comminuting device according to the invention differs from similar grating or like cutting devices in that the edges of the grating or cutting surface of the cutter plate have locating parts adapted to be fitted to the protective casing of the known cutting device, said casing being constructed in the form of a cap serving as a handle, and in that the handle part and the cutter plate can be releasably connected by means of a detachable shaft.

The locating parts are preferably formed on either side of the cutting surface by edges with guide surfaces and abutment edges adapted to the shape of the handle cap or the edges thereof. As in the case of the known stripper plates, the lateral guide surfaces of the cutter plate may be provided with a fastening projection formed with a bore to receive the detachable shaft at the end remote from the operative surface.

The cutter plate is advantageously made from metal or a suitable synthetic plastics material. The operative surface is formed with apertures for the passage of the food or the like into the cavity formed by the handle part and the cutter plate. This is a simple means of ensuring that the comminuted material collects inside the device, since the majority of the comminuted material passes through these apertures into the interior of the cavity formed by the handle part and the cutter plate, and it can easily be removed therefrom.

The comminuting device according to the invention is a handy and easily operated kitchen utensil capable of many uses. For example, the device can be held in one hand and the article to be grated can be held in the other hand. Alternatively, the device can be held on the surface of the table, for example, like a normal grater while the material to be comminuted is moved to and fro over the operative surface in known manner with the application of pressure. A further possible use of the device according to the invention is, for example, to hold the food or the like on a fixed support and move the comminuting device over the same with the other hand.

Further details of the invention will be apparent from the following description of one example of embodiment illustrated in the accompanying drawing wherein.

Figure 1:
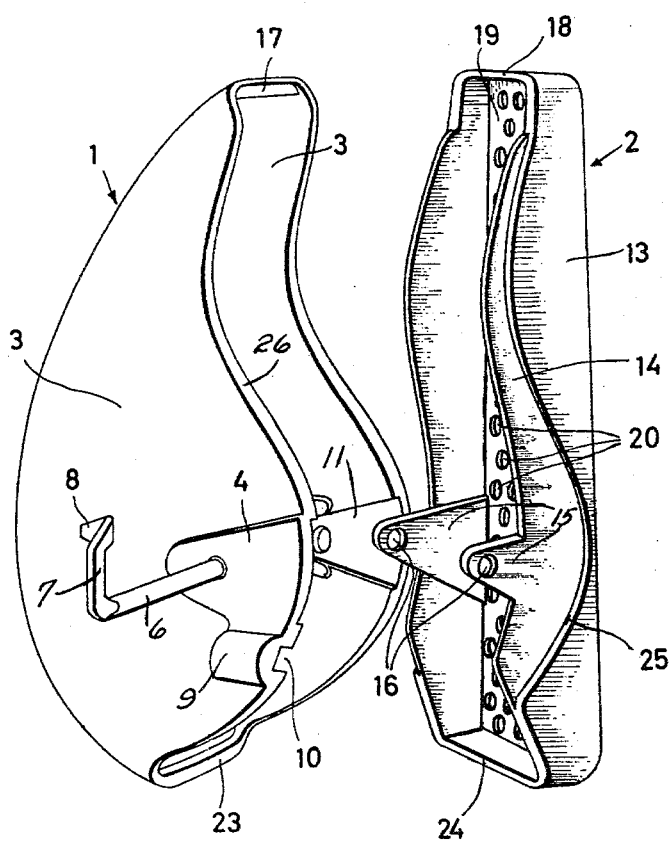
FIG. 1 is an elevation view of the handle part and the cutter plate part in the dismantled state in different perspective views.

As will be clear from FIG. 1, the comminuting device according to the invention consists essentially of the top or handle part 1 and the bottom or cutter plate part 2 which can be inserted into the handle part. The latter is a known protective casing for the afore-described known cutting device defining a downwardly open cavity and intended to receive a cutting cylinder consisting of disc cutters spaced apart on a hollow shaft in said cavity. Such a cutting cylinder is normally formed with a bore through which is passed a detachable shaft 6 which is guided in the casing 1. At one end this detachable shaft is formed with hook-shaped projections 7, 8. The hook end 8 is retained in a corresponding recess 10 in a lateral projection 9 on one side 3 of the casing. To ensure that the thickness of the material of the side walls 3 of the handle 1 are constant despite the wedge-shaped recess 11 on the insides, the sides 3 of the casing are formed with reinforcing lugs 4 in the region of the bore of the detachable shaft.

The cutter plate part 2 shown in the bottom half of the FIGURE 1 consists of a level cutter plate 19 formed with bores 20. Adjacent this plate on either side are the transversely projecting edges 13 each having a guide surface 14 and an abutment face 25 to receive a cooperating abutment face 26 of the protective cap 1. The side edges 13, together with the plate 19, a front edge 24 and a rear edge 18 form a shallow, upwardly open trough. The two guide surfaces 14 are formed with a fastening projection 15 which, at its end remote from the plate 19, has a bearing bore 16 to receive the detachable shaft 6. The abutment faces 25 extend forward and backward from the common axis of the bearing bores 6. The shape of the fastening projections 15 is adapted to the wedge-shaped recess 11 on the inner wall of the two side parts 3 of the handle part so that when the cutter plate part and the handle part are assembled mutual guidance is obtained and the detachable shaft 6 can be passed through the bores without any re-adjustment being necessary.

Figure 2:
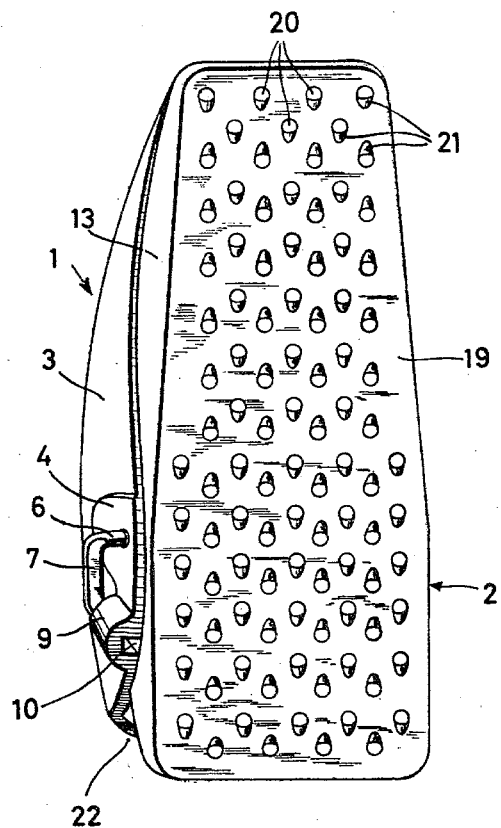
FIG. 2 is a perspective plan view of the operative surface of the device at an angle from below.

In FIG. 2, the handle part and the cutter plate part are shown in the assembled state and the abutment face 26 of the handle part 1 can just be seen projecting beyond the edge of the cutter plate part 2. It will also be clear from FIG. 2 that the edges of the apertures 20 in the plate 19 are formed with small lateral projections 21 for the grating or cutting of the material to be comminuted. The projections 21 are preferably disposed on either side of the apertures 20 in such manner that the same effect is obtained in each direction of movement when the food or the like is moved to and fro. When this device is used, the comminuted material passes through the apertures 20 into the interior of the casing formed by the cutter plate part and the handle part.

In the illustrated embodiment of the invention, the two parts 1 and 2 do not bear upon one another along the entire edge but form an aperture 22 near the front edges 23, 24 shown on the left in the figures, and this aperture enables the user of the appliance to check how full the interior of the device is. The rear edges 17 and 18 of the handle part and the cutter plate part bear rigidly upon one another at the rear end of the device.

The cutter plate 19 of the bottom part 2 will be shaped according to the purpose for which the device is intended. The cutter plate part 2 normally consists of a suitable thermoplastic. In special cases, however, this part may be made from metal.

I claim:

1. A cutter plate attachment for use with a handle part, said handle part defining a cavity having one open side, the attachment comprising:
   (a) a plate member formed with a plurality of apertures therethrough;
   (b) cutting means at each aperture;
   (c) an edge member transversely extending from said plate member and integral therewith, said edge member having a guide face slidably engageable with said handle part for guiding said attachment into an operative position relative to said handle part in which said plate member substantially closes said open side; and
   (d) fastening means on said edge member for fastening the same to said handle part in said operative position,
      (1) said fastening means including a shaft member having an axis,
      (2) said edge member being formed with bearing means rotatably receiving said shaft member, and having abutment face means engageable with said handle part for preventing rotary movement of said attachment about the axis of said shaft member.

2. A cutter plate attachment for use with a handle part, said handle part defining a cavity having one open side, the attachment comprising:
   (a) a plate member formed with a plurality of apertures therethrough;
   (b) cutting means at each aperture;
   (c) an edge member transversely extending from said plate member and integral therewith, said edge member having a guide face slidably engageable with said handle part for guiding said attachment into an operative position relative to said handle part in which said plate member substantially closes said open side; and
   (d) fastening means on said edge member for fastening the same to said handle part in said operative position,
      (1) said edge member together with said plate member forming a trough open in a direction away from said plate member,
      (2) said edge member having two side parts each including bearing means transversely spaced from said plate member,
      (3) said fastening means including a shaft member simultaneously received in said bearing means and having an axis, and a plurality of abutment face means on said edge member spaced from said axis in opposite radial directions and engageable with said handle part for preventing rotation of said attachment about said axis when in said operative position.

3. A comminuting device comprising, in combination:
   (a) a handle part defining a cavity having an open side;
   (b) a plate member formed with a plurality of apertures therein;
   (c) cutting means at each aperture;
   (d) an edge member transversely extending from said plate member and integral therewith, said edge member having a guide face slidably engaging said handle part for guiding said plate member into an operative position relative to said handle part in which said plate member substantially closes said open side; and
   (e) fastening means on said edge member for fastening the same to said handle part in the operative position of said plate member,
      (1) said fastening means including a shaft member about said axis, and
      (2) said edge member and said handle part being formed with axially aligned bearing means movably receiving said shaft member for relative rotation of said handle part and said plate member about said axis, and
      (3) cooperating abutment means on said handle part and on said edge member for preventing relative rotation of said handle part and of said plate member about said axis.

4. A comminuting device comprising in combination:
   (a) a handle part defining a cavity having an open side;
   (b) a plate member formed with a plurality of apertures therein;
   (c) cutting means at each aperture;
   (d) an edge member transversely extending from said plate member and integral therewith, said edge member having a guide face slidably engaging said handle part for guiding said plate member into an operative position relative to said handle part in which said plate member substantially closes said open side; and
   (e) fastening means on sadi edge member for fastening the same to said handle part in the operative position of said plate member,
      (1) said edge member together with said plate member forming a trough open in a direction away from said plate member, said edge member having two side parts,
      (2) said handle part being formed with aligned bearing means transversely spaced from said plate member, and
      (3) said fastening means including a shaft member received in said aligned bearing means and having an axis, and a plurality of cooperating abutment face means on said edge member and on said handle part,
      (4) said abutment face means being spaced from said axis in opposite radial directions for preventing relative rotation of said handle part and of said plate member about said axis.

5. A device as set forth in claim 3, wherein the guide face of said edge member engages said handle part in the cavity thereof.

6. A device as set forth in claim 4, wherein said shaft member is axially slidable in the aligned bearing means of said side parts and of said handle part, whereby said plate member may be released from said handle part by axially withdrawing said shaft member from said bearing means.

7. A device as set forth in claim 6, wherein said edge member has a front part and a rear part connecting said side parts, said front part being spaced from said handle part, and said side and rear parts engaging said handle part when said plate member is in said operating position, whereby said front part and said handle part define an aperture for access to said cavity.

References Cited by the Examiner

UNITED STATES PATENTS

| | | | |
|---|---|---|---|
| 2,615,486 | 10/52 | Marcus | 146—180 |
| 2,714,908 | 8/55 | Carmack | 146—180 X |
| 2,720,234 | 10/55 | Fett | 146—180 |

J. SPENCER OVERHOLSER, *Primary Examiner.*

LOUIS J. CAPOZI, *Examiner.*